US011319165B2

(12) United States Patent
Friedrich et al.

(10) Patent No.: US 11,319,165 B2
(45) Date of Patent: May 3, 2022

(54) SPHERICAL PLAIN BEARING

(71) Applicant: AKTIEBOLAGET SKF, Gothenburg (SE)

(72) Inventors: Thomas Friedrich, Hausen (DE); Stefan Keller, Schweinfurt (DE)

(73) Assignee: AKTIEBOLAGET SKF, Gothenburg (SE)

( * ) Notice: Subject to any disclaimer, the term of this patent is extended or adjusted under 35 U.S.C. 154(b) by 0 days.

(21) Appl. No.: 16/922,074

(22) Filed: Jul. 7, 2020

(65) Prior Publication Data

US 2021/0010534 A1   Jan. 14, 2021

(30) Foreign Application Priority Data

Jul. 8, 2019  (DE) .......................... 102019210006.6

(51) Int. Cl.
*B65G 47/76* (2006.01)
*F16C 23/04* (2006.01)

(52) U.S. Cl.
CPC .......... B65G 47/766 (2013.01); *F16C 23/046* (2013.01)

(58) Field of Classification Search
CPC .... F16C 23/043; F16C 23/045; F16C 23/046; F16C 33/74; F16C 35/073; B65G 47/766; B65G 47/82

USPC ..................................................... 198/370.07
See application file for complete search history.

(56) References Cited

U.S. PATENT DOCUMENTS

| 4,053,190 A | * | 10/1977 | McCloskey | ........... | B23P 15/003 384/192 |
| 7,963,385 B2 | * | 6/2011 | Sng | ...................... | B65G 47/766 198/370.07 |

FOREIGN PATENT DOCUMENTS

| GB | 486220 | * | 6/1938 |
| GB | 1185717 | * | 3/1970 |
| WO | WO2014/161561 | * | 10/2014 |

* cited by examiner

*Primary Examiner* — James Pilkington
(74) *Attorney, Agent, or Firm* — J-Tek Law PLLC; Mark A. Lissai

(57) ABSTRACT

A spherical bearing assembly includes a shaft extending through an opening of an inner ring, the inner ring having a spherically curved outer surface, a clamping sleeve on the shaft, the clamping sleeve extending through the opening of the inner ring, and an outer ring having an inner surface complementary to the outer surface of the inner ring. The inner ring is mounted in the outer ring with the outer surface of the inner ring slidably supported by the inner surface of the outer ring.

7 Claims, 3 Drawing Sheets

SPHERICAL PLAIN BEARING

CROSS-REFERENCE

This application claims priority to German patent application no. 10 2019 210 006.6 filed on Jul. 8, 2019, the contents of which are fully incorporated herein by reference.

TECHNOLOGICAL FIELD

The present disclosure is directed to a spherical plain bearing for supporting a shaft, in particular a shaft of a deflecting flap of a conveyor belt system, used to transport, for example, bulk material, such as, for example, crushed stone in a stone-crushing machine.

BACKGROUND

Spherical plain bearings usually include an inner ring and an outer ring, the inner ring being configured to support the shaft, and the inner and outer rings having spherical surfaces matched to each other that slide against each other. A lubricant can be disposed between the spherical surfaces. Such spherical plain bearings are used in many machines and can receive heavy loads and compensate for misalignments.

Conveyor belt systems or bulk-material transporting systems, such as, for example, those associated with in stone-crushing machines, which are used in particular in surface mining or in road construction, usually include a plurality of conveyor belts via which material to be transported is conveyed. In order to at least partially divert the material from one belt to another belt, for example, a secondary belt, so-called deflection flaps or bypass flaps are provided on such machines, and a material-transport direction can be changed with the aid of these deflection flaps or bypass flaps. Thus, for example, a stone-crushing machine may include a receptacle into which the stones to be crushed are loaded, a crusher unit, and downstream sieve and material transport belts in order to sort the crushed stones. Furthermore, such a stone-crushing machine may include at least one so-called bypass flap—i.e., a deflecting flap—via which the material transport direction of the crushed and sorted material can be adjusted. Thus, for example, with the aid of the bypass flap, material can be diverted onto a secondary conveyor belt. Here this flap is usually opened or closed in a+/−90° rotation and is directly screwed onto the machine housing.

Since the machine housing of such a conveyor belt system is a welded system, the tolerances for the attachment points of the flap shaft are very high. This causes high complexity and high costs during the adjusting of the flap in the machine.

The adjusting system for supporting and attaching the bypass flap to the housing must also be configured to withstand the strong vibrations that originate from the sorting process, in particular a vibrating screen. The entire adjusting system must therefore itself be clamped and thus clearance-free.

In order to achieve this, up until now a cylindrical fitting of the shaft of the bypass flap has been used in order to compensate for the axial tolerances during attaching. The shaft is radially clamped on its cylindrical fitting by two half-shells that each enclose an angle of 180° in order to eliminate a radial clearance and fix the bypass flap. The attachment device is disposed on an adjusting frame. This frame in turn is attached to the machine side walls. Through-bores for the attachment elements on the frame are enlarged in their diameters in comparison to the machine side walls in order to thus allow a radial adjusting of the bypass flap during the assembly process. However, when the diameter of the through-bores is not large enough to compensate for the tolerances of the welded structure, the bypass flap must be dismantled and re-processed, and then the assembly process must be initiated from the beginning.

The installation and adjusting process is thus time and cost intensive.

SUMMARY

An aspect of the present disclosure is therefore to provide a bearing assembly suitable for supporting the shaft of a bypass flap, which bearing assembly reduces the above-mentioned disadvantages.

In the following a spherical plain bearing for supporting a shaft, in particular of a bypass flap of a conveyor belt system, such as, for example, a conveyor belt used in a stone-crushing machine, is disclosed, where the spherical plain bearing includes an inner ring and an outer ring. Here the inner ring is configured to support the shaft and has a radial outer surface that has a spherical shape. The outer ring includes an inner surface that also has a spherical shape. The spherical shape of the outer ring is adapted to that of the inner ring so that the inner ring is slidingly supported in the outer ring.

In order to facilitate the support of the shaft, for example, the shaft of the bypass flap, and to be able to more easily compensate for tolerances in the attachment, a clamping sleeve is arranged between bearing inner ring and the shaft, which clamping sleeve attaches the sliding bearing to the shaft. This clamping sleeve provides an axial positioning on the shaft so that axial tolerances can be compensated for.

However, the spherical plain bearing itself allows the radial and angular misalignment of the shaft to be compensated for with respect to the attachment points on the machine walls without limiting the rotational function of the shaft. According to the disclosure, supporting of the shaft via a spherical plain bearing including a clamping sleeve can considerably simplify the attaching and adjusting process of the bypass flap, even when large misalignment values are to be compensated for. In addition, attachment via the clamping sleeve allows an easy attachment of the inner ring and an elimination of the clearance inside the spherical plain bearing due to the radial interlocking of the split outer ring.

According to a further advantageous exemplary embodiment, the clamping sleeve comprises a cylindrical inner surface, that abuts on the shaft, and a frustoconical outer surface, that contacts an inner surface of the inner ring. This shape significantly facilitates the attaching of the inner ring and the axial attaching of the inner ring.

Furthermore, the spherical plain bearing includes an inner ring including a frustoconical inner surface by which it contacts the clamping sleeve. A matched system can thereby be provided so that the inner ring abuts against the clamping sleeve over its entire inner surface. It is preferred in particular when the inclination of the clamping sleeve and the inclination of the frustoconical surface of the inner ring are aligned with respect to each other.

According to a further preferred exemplary embodiment, the outer ring is configured in two-parts. Due to the spherical surface thus formed inside the two outer-ring halves, the inner ring can be clamped axially when the two halves are attached to each other, in particular screwed to each other. This allows for attaching with a specific axial preload value.

Any clearance in the bearing can thereby be avoided and vibrations can be absorbed without wear.

Furthermore, it is preferred when the inner ring and/or the clamping sleeve is axially secured on the shaft and on the clamping sleeve via a shaft nut. This shaft nut allows an exact axial positioning of the inner ring on the shaft and thus in the axial direction. The shaft nut can in turn be secured against a twisting or loosening by a securing metal-plate.

According to a further advantageous exemplary embodiment, the outer ring is disposed on a machine housing, in particular on the machine housing of a vibrating screen or of a bypass flap for deflecting a material stream of a stone-crushing machine. Here the outer ring is preferably attached to the side walls of the machine by screws. These screws also clamp the outer ring halves and thus the entire spherical plain bearing. This results in a clearance-free spherical plain bearing.

According to a further advantageous exemplary embodiment, a sliding space formed between inner ring and outer ring is sealed. This is preferably achieved by one or more seals such as, for example, O-rings, which are attached on one, preferably both, axial sides of the outer ring or inner ring. If the outer ring is also configured two-part, a further seal, in particular an O-ring, can be disposed between the two ring halves and seal the sliding space. These seals prevent any entry of contaminants into the space between inner ring and outer ring and thus onto the sliding surface. Alternatively the spherical plain bearing can be equipped with integrated contact seals.

Furthermore, a lubricant can be provided in the sliding space. Friction on the sliding surfaces between the inner and outer ring can thereby be reduced.

According to a further exemplary embodiment, the lubricant can be exchanged via a lubricant outlet or inlet point so that the bearing can be relubricated. This can be effected, for example, via the split outer ring.

A further aspect of the present disclosure relates to a stone-crushing machine including a screen device and/or a bypass flap for deflecting a material flow, including a spherical plain bearing as has been described above.

Further advantages and advantageous embodiments are specified in the description, the drawings, and the claims. Here in particular the combinations of features specified in the description and in the drawings are purely exemplary, so that the features can also be present individually or combined in other ways.

In the following the invention will be described in more detail using exemplary embodiments depicted in the drawings. Here the exemplary embodiments and the combinations shown in the exemplary embodiments are purely exemplary and are not intended to define the scope of the invention. This scope is defined solely by the pending claims.

DETAILED DESCRIPTION

In the following, identical or functionally equivalent elements are designated by the same reference numbers.

Figure 1:
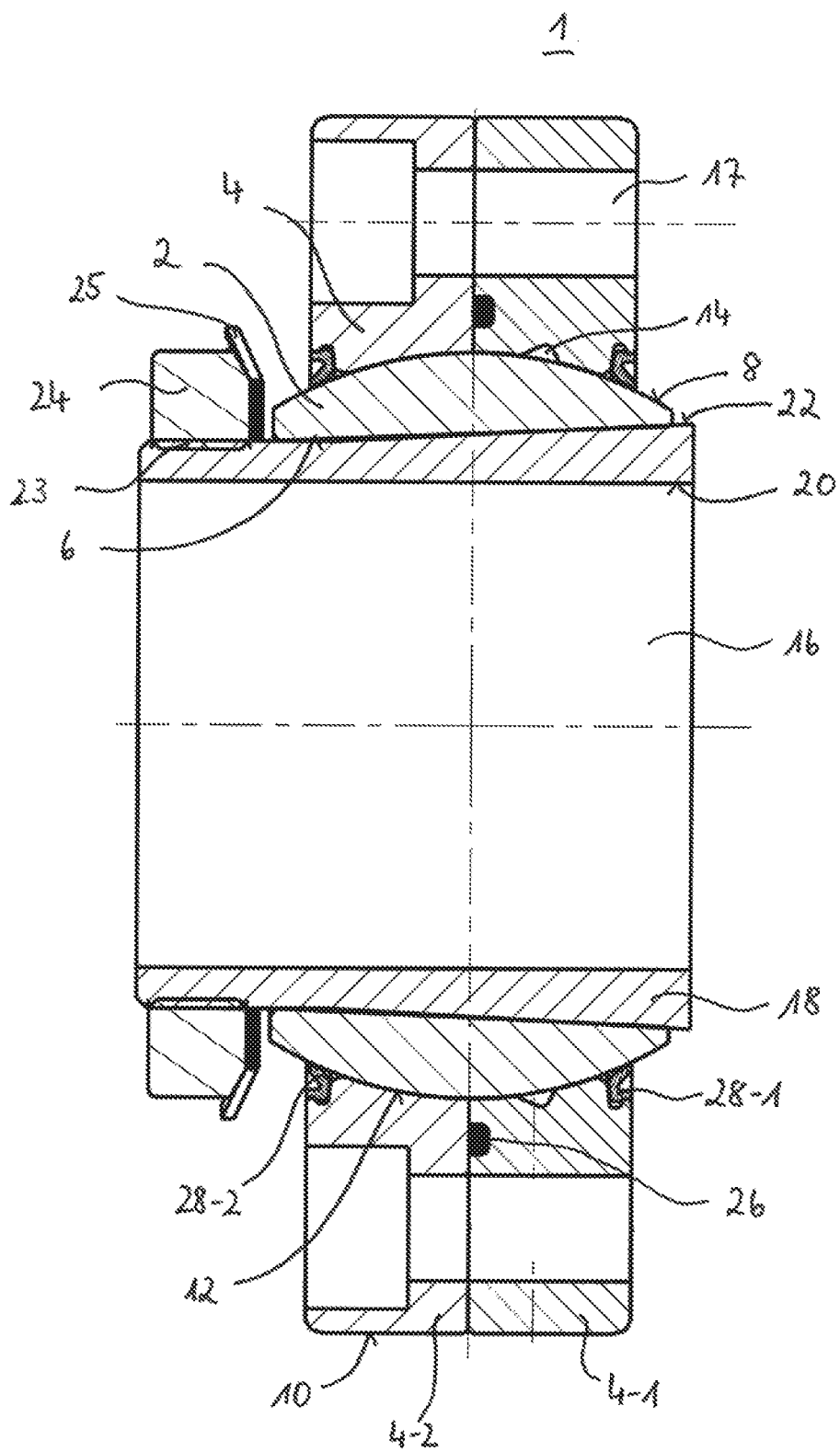
FIG. 1 is a schematic sectional view through a spherical plain bearing according to a first exemplary embodiment of the disclosure.

FIG. 1 schematically shows an axial section through a spherical plain bearing 1 that is can be used for supporting a bypass flap of a conveyor belt system, such as, for example, of a stone-crushing machine. The spherical plain bearing 1 includes an inner ring 2 and an outer ring 4. The inner ring 2 has an inner surface 6 and a spherical outer surface 8. The outer ring 4 includes an outer surface 10 and a spherical inner surface 12. The spherical outer surface 8 of the inner ring 2 is in turn configured to slide on the spherical inner surface 12 of the outer ring 4. A sliding space 14 is provided between the spherical surfaces 8, 12 of inner ring 2 or outer ring 4. In this sliding space 14 lubricant can be present in order to reduce the friction on the sliding surfaces 8, 12.

Figure 4:
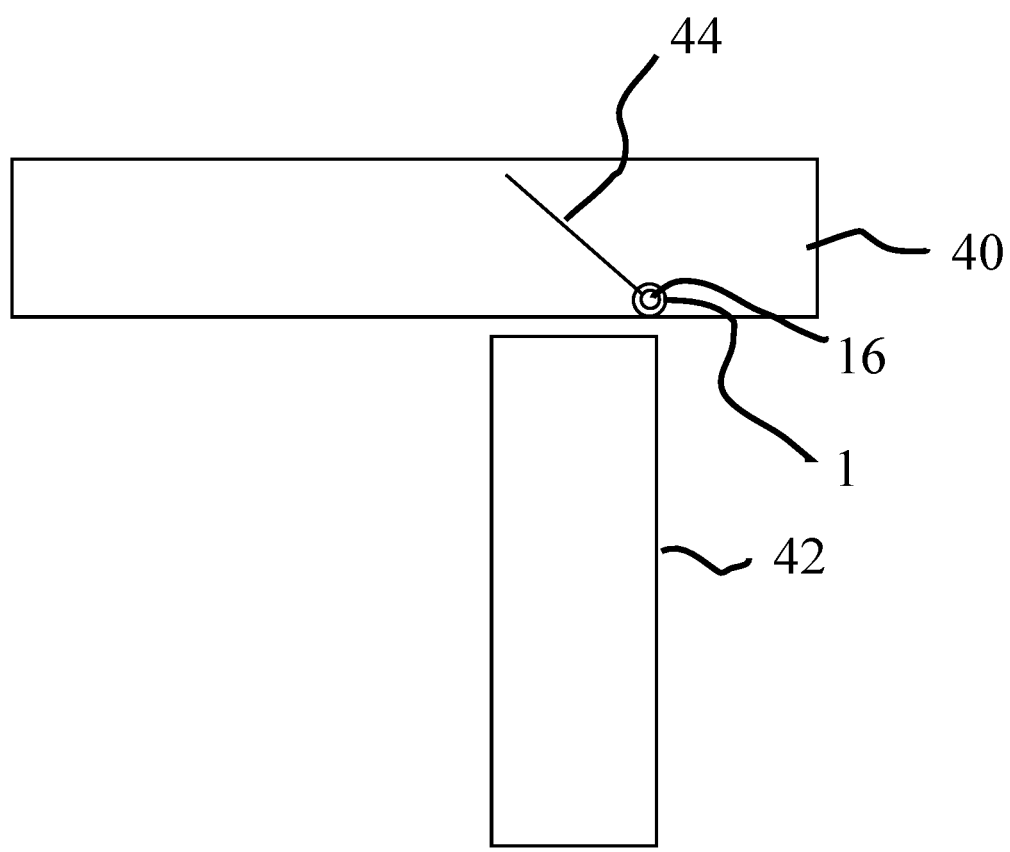
FIG. 4 is a schematic view of a bypass flap mounted on a shaft supported by the spherical plain bearing.

Furthermore, FIG. 1 shows that the spherical plain bearing 1 is configured to support a shaft 16. Here the shaft 16 is in particular the shaft 16 of a bypass flap (44 in FIG. 4) of a conveyor belt system having a first belt 40 and a second belt 42, such as, for example, a stone-crushing machine (also not shown). Furthermore, it can be seen from FIG. 1 that the outer ring 4 includes bores 17 by which the spherical plain bearing 1 can be attached to the machine housing, in particular a machine frame of the conveyor belt system.

In order to attach the inner ring 2 to the shaft 16, the spherical plain bearing 1 also includes a clamping sleeve 18. The clamping sleeve 18 is disposed between inner ring 2 and shaft 16, and has a frustoconical shape having a cylindrical inner surface 20 and an inclined outer surface 22.

The inclined outer surface 22 is in contact with the inner surface 6 of the inner ring 2. In order to achieve a particularly good contact between clamping sleeve 18 and inner ring 2, the inner surface 6 of the inner ring 2 is also configured frustoconical and adapted to the inclination of the outer surface 22 of the clamping sleeve 18. With this clamping sleeve 18, an easy axial positioning of the spherical plain bearing 1 can be achieved with respect to the housing and the shaft 16.

However, the spherical outer surface 8 of the inner ring 2 and the spherical inner surface 12 of the outer ring 4 allow for compensation of a radial offset or of a misalignment of the shaft 16. An axial and radial misalignment of the shaft, which arise due to the large manufacturing tolerances of the machine housing, can thus be compensated for without having to carry out a complex adjustment.

Furthermore, it is shown in FIG. 1 that the inner ring is additionally secured on the shaft 16 by a shaft nut 24 provided with an inner thread 23. Here the shaft nut serves in particular for fixing the clamping sleeve 18 on the shaft 16. For this purpose the shaft nut is connected to the clamping sleeve 18 via the thread 23. During the screwing-on of the shaft nut 24, the clamping sleeve 18 is thus drawn into its final position in the inner ring 2. The axial positioning of the clamping sleeve 18 can thereby be fixed. Furthermore it can be seen from FIG. 1 and in particular FIG. 2 that the shaft nut 24 can in turn be secured against loosening by a securing metal plate 25. For this purpose the securing metal plate 25 can include brackets 35 that engage in openings 36 on the shaft nut 24 in order to prevent the twisting and thus loosening of the shaft nut 24 and ultimately also of the clamping sleeve 18 and of the inner ring 2.

The outer ring 4 is preferably two-part and includes a seal 26, in the form, for example, of an O-ring, in order to protect the sliding space 14 from contaminants between inner ring 2 and outer ring 4. In addition, seals 28-1, 28-2 can be provided laterally on both axial sides of the outer ring 4; the seals 28-1, 28-2 also protect the sliding space 14 between inner ring 2 and outer ring 4 from contaminants. In addition, the seals 26, 28-1, 28-2 can hold a lubricant present in the sliding space in the sliding space 14.

Figure 2:
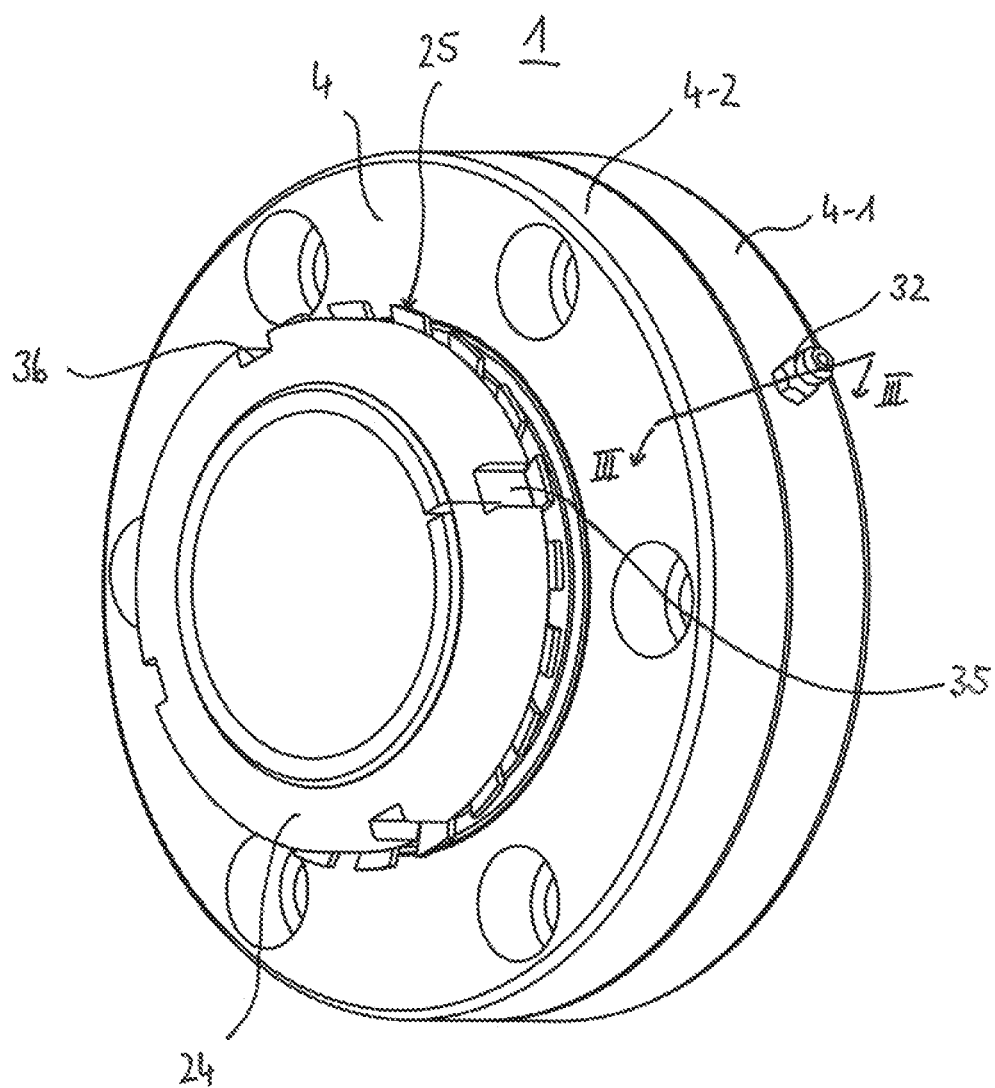
FIG. 2 is a perspective spatial view of the spherical plain bearing of FIG. 1.

In order to allow for a lubricant exchange or entry, a lubricant-supply point 30 including a lubricating nipple 32 can be provided on the outer ring, in particular on a part 4-1 of the outer ring, via which lubricant supply point 30 lubricant is introducible into the sliding space 14. The arrangement of the lubricant-supply point 30 and in particular of the lubricant nipple 32 on the outer ring is schematically depicted in FIG. 2 and in detail in FIG. 3. FIG. 2 shows a schematic perspective view of the spherical plain bearing 1 from FIG. 1, but without the shaft 16 and the clamping sleeve 18.

Figure 3:
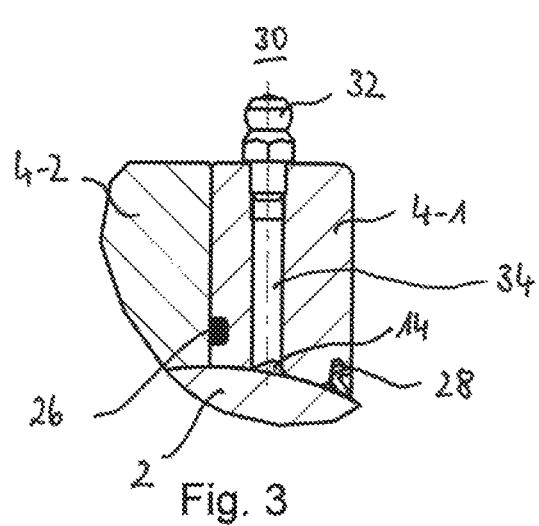
FIG. 3 is a detail view of the spherical plain bearing of to FIGS. 1 and 2.

FIG. 3 is a detail of an axial sectional view along the line of FIG. 2 through the lubricant supply point 30. As can be seen from FIG. 3, the lubricant inlet 30 extends from the lubricating nipple 32, via a bore 34 through the outer ring part 4-1, into the sliding space 14 between the inner ring 2 and the outer ring 4. It is possible to introduce lubricant via this lubricant inlet 30 into the bearing or discharge lubricant from the bearing. Other embodiments are of course possible.

Overall, with the disclosed spherical plain bearing assembly a shaft of a bypass flap of a stone-crusher can be supported such that the bypass flap can be simply and quickly be attached and adjusted without a complex adjusting and attaching being required. The clamping sleeve allows the bearing to be axially aligned on the shaft in order to thus compensate for axial tolerances. However, the shape of the spherical plain bearing can compensate for radial and angular deviations, which also compensates for the misalignment of the shaft due to the manufacturing tolerances to be expected. The outer ring is directly screwable onto the machine so that attachment is also simplified, wherein during the attaching of the outer ring on the machine no special precautions need to be taken. Due to the radial division of the outer ring the bearing can be preloaded, in particular by the use of a shaft nut, so that no clearance arises in the bearing and vibrations can be accommodated without wear.

Representative, non-limiting examples of the present invention were described above in detail with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved spherical plain bearings.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

What is claimed is:

1. A conveyor belt system comprising:
a frame;
a first conveyor belt;
a second conveyor belt;
a bypass flap for diverting a material stream from the first conveyor belt onto the second conveyor belt and including a shaft; and
a single spherical plain bearing configured to support the shaft of the bypass flap and including:
an inner ring having a spherically curved outer surface and a frustoconical inner surface defining an opening;
a clamping sleeve extending through the opening of the inner ring and having a cylindrical inner surface disposed about, the shaft and a frustoconical outer surface in contact with the frustoconical inner surface of the inner ring to permit axial adjustment between the spherical bearing and the shaft, and
an outer ring attached to the frame and having a spherical inner surface complementary to the spherical outer surface of the inner ring, the inner ring being mounted in the outer ring with the outer surface of the inner ring slidably supported by the inner surface of the outer ring such that the spherical plain bearing is configured to compensate for radial and angular misalignment of the shaft.

2. The conveyor belt system according to claim 1, wherein the outer ring is configured in two-parts.

3. The conveyor belt system according to claim 1, further comprising a shaft nut threadably engaged with the clamping sleeve to axially secure the inner ring to the shaft and to the clamping sleeve.

4. The conveyor belt system according to claim 3 wherein:
the shaft nut has at least one opening; and
the conveyor belt system further comprises a securing plate having at least one bracket engageable with the at least one opening of the shaft nut to prevent loosening of the shaft nut and the inner ring.

5. The conveyor belt system according to claim 1, including a seal ring between the inner ring and the outer ring, the seal ring sealing a sliding space between the outer surface of the inner ring and the inner surface of the outer ring.

6. The conveyor belt system according to claim 1, including lubricant in a sliding space between the inner ring and the outer ring.

7. The conveyor belt system according to claim 6, wherein a lubricant supply assembly is provided on the outer ring that includes a radial bore extending in the outer ring via which lubricant is suppliable to the sliding space.

* * * * *